(12) United States Patent
Martin

(10) Patent No.: US 8,245,695 B2
(45) Date of Patent: Aug. 21, 2012

(54) METHOD OF MANUFACTURING AND INSTALLATION OF HIGH PRESSURE LIQUID LPG FUEL SUPPLY AND DUAL OR MIXED FUEL SUPPLY SYSTEMS

(75) Inventor: John T. Martin, Melbourne (AU)

(73) Assignee: Interlocking Buildings Pty Ltd., Melbourne, Victoria (AU)

( * ) Notice: Subject to any disclaimer, the term of this patent is extended or adjusted under 35 U.S.C. 154(b) by 0 days.

(21) Appl. No.: 12/619,956

(22) Filed: Nov. 17, 2009

(65) Prior Publication Data

US 2010/0126468 A1 May 27, 2010

Related U.S. Application Data

(63) Continuation of application No. PCT/AU2008/000726, filed on May 23, 2008.

(30) Foreign Application Priority Data

May 23, 2007 (AU) .............................. 2007902747

(51) Int. Cl.
*F02M 63/00* (2006.01)
*F02M 57/02* (2006.01)
*F02M 21/02* (2006.01)
*F02M 21/00* (2006.01)

(52) U.S. Cl. .................. 123/447; 123/446; 123/525

(58) Field of Classification Search .................. 123/446, 123/447, 525, 526, 527, 529
See application file for complete search history.

(56) References Cited

U.S. PATENT DOCUMENTS

| | | | |
|---|---|---|---|
| 3,406,666 A | 10/1968 | Steiger | |
| 5,377,645 A * | 1/1995 | Moore | 123/525 |
| 5,542,398 A * | 8/1996 | Marcon | 123/527 |
| 5,592,924 A * | 1/1997 | Audisio et al. | 123/525 |
| 5,623,907 A * | 4/1997 | Cotton et al. | 123/456 |
| 5,690,078 A | 11/1997 | Ofner | |

(Continued)

FOREIGN PATENT DOCUMENTS

AU 647561 6/1992
(Continued)

OTHER PUBLICATIONS

State Intellectual Property Office of the People's Republic of China, Notification of the First Office Action Dated Apr. 13, 2011 (6 pages).

(Continued)

*Primary Examiner* — Stephen K Cronin
*Assistant Examiner* — Raza Najmuddin
(74) *Attorney, Agent, or Firm* — Volpe and Koenig, P.C.

(57) ABSTRACT

A high vapor pressure liquid fuel (e.g. LPG) injection system is provided that keeps the fuel liquid at all expected operating temperatures by use of a high pressures pump capable of at least 2.5 MPa pressures. The fuel can be injected directly into the cylinder or into the inlet manifold of an engine via axial or bottom feed injectors and also could be mixed with a low vapor pressure fuel (e.g. diesel) to be injected similarly. The fuel, mixed or unmixed, can be stored in an accumulator under high pressure assisting in keeping the engine running during fuel changeovers and injection after a period of time as in re-starting the engine. The same injectors can be used to inject any of the fuels or mixtures of them.

19 Claims, 3 Drawing Sheets

U.S. PATENT DOCUMENTS

| | | | |
|---|---|---|---|
| 5,887,574 A | 3/1999 | Smith | |
| 5,967,126 A | 10/1999 | Ofner | |
| 6,050,237 A * | 4/2000 | Ferrera et al. | 123/276 |
| 6,230,684 B1 * | 5/2001 | Furuhashi et al. | 123/467 |
| 6,234,128 B1 * | 5/2001 | Reuss | 123/179.17 |
| 6,415,770 B1 * | 7/2002 | Kojima | 123/511 |
| 6,748,931 B2 * | 6/2004 | Ricco | 123/527 |
| 6,854,447 B2 * | 2/2005 | Miandoab et al. | 123/467 |
| 7,028,672 B2 * | 4/2006 | Glenz et al. | 123/514 |
| 7,185,635 B2 | 3/2007 | Frank et al. | |

FOREIGN PATENT DOCUMENTS

| | | |
|---|---|---|
| AU | 647857 | 6/1992 |
| AU | 669444 | 8/1994 |
| AU | 672494 | 8/1994 |
| AU | 672495 | 8/1994 |
| DE | 219054 A3 | 2/1985 |
| GB | 2392957 A | 3/2004 |
| GB | 2407620 A | 5/2005 |
| NL | 8300163 A | 8/1984 |
| WO | 2004018854 A1 | 3/2004 |

OTHER PUBLICATIONS

Propane & Natural Gas Conversions, "Alternate Fuels Technologies, Inc." (7 pages) http://www.propanecarbs.com/propane.html.

* cited by examiner

METHOD OF MANUFACTURING AND INSTALLATION OF HIGH PRESSURE LIQUID LPG FUEL SUPPLY AND DUAL OR MIXED FUEL SUPPLY SYSTEMS

CROSS REFERENCE TO RELATED APPLICATION

This application is a continuation of International Application No. PCT/AU2008/000726 filed May 23, 2008, which claims priority to Australian Patent Application No. 2007902747, filed May 23, 2007, the entire contents of all of which are incorporated by reference as if fully set forth.

FIELD OF INVENTION

This invention relates to a system of injection for a high vapor pressure fuel, such as LPG or injecting a mix of fuels and a changeover from one fuel to another.

BACKGROUND

It is most advantageous if liquid petroleum gas (LPG) can be fed to an engine in liquid form so gaining the advantage of the better combustion provided by the volumetric effect, the phase change from liquid to gas.

Prior art (Granted Australian Patents 647561, 647857) has disclosed energy efficient low pressure methods of delivering liquid LPG into the inlet manifold of a spark ignition (SI) engine.

SUMMARY

The present disclosure is directed to a liquid fuel injection system for a combustion engine. The system includes a high pressure electric pumping system arranged to receive high vapor pressure fuel in liquid form from a pressure tank. The electric pumping system is arranged to pump the liquid high vapor pressure fuel from the pressure tank at a controlled pressure high enough to ensure it is pumped in liquid form to a variable volume accumulator which is arranged to direct the liquid fuel to fuel injectors for the combustion engine. The system also includes a regulating system for maintaining the fuel pumped to the fuel injectors at the controlled pressure in liquid form.

BRIEF DESCRIPTION OF THE DRAWINGS

The invention is to be subsequently explained in more detail based on exemplary embodiments in conjunction with the drawings. In the drawings.

DETAILED DESCRIPTION OF THE PREFERRED EMBODIMENTS

This invention provides a liquid fuel injection system employing a high pressure pumping system and accumulator, to provide a constant and adequate high pressure fuel supply of high vapor pressure fuel such as LPG alone, or in a fuel mixture, such as a lower vapor pressure fuel such as petrol or diesel, maintained in a liquid stage to fuel injectors. The fuel injector may be axial or bottom feed liquid fuel injectors injecting into the inlet manifold or cylinders of a spark ignition internal combustion engine, or directly into the cylinders of a diesel or compression engine, to keep said engine running at its critical usable power output levels.

In a spark ignition engine the invention may provide a seamless changeover from a high vapor pressure fuel to another fuel of lower vapor pressure of which a change from LPG to petrol is an example.

The system, as configured, may be controlled electronically, such as by an engine management system.

Figure 1:
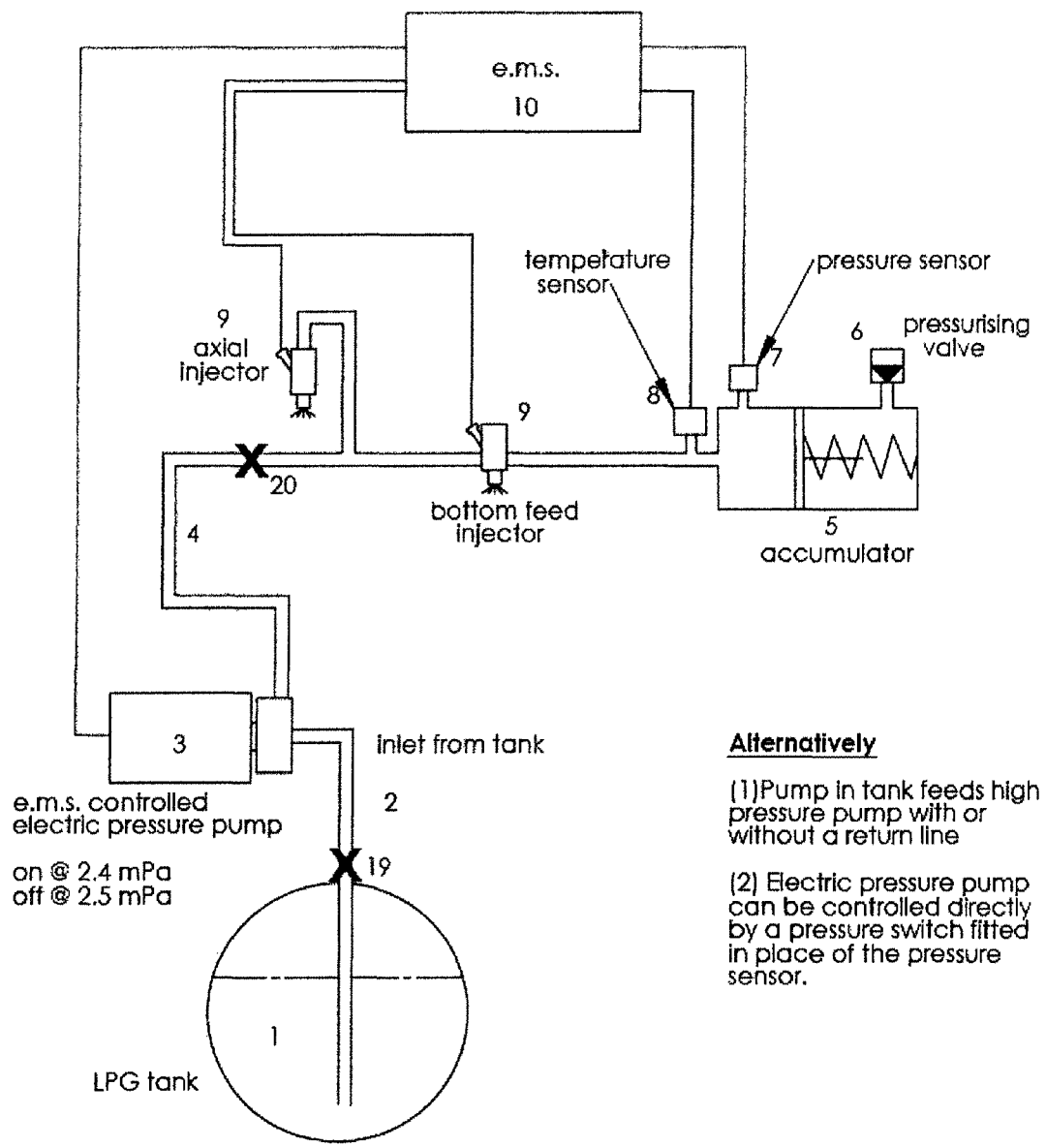
FIG. 1 is a schematic representation of a first embodiment of the system of the present invention.

According to the invention, an advantageous alternative is to overcome the high vapor pressure of the LPG so enabling the delivery of the LPG to the inlet manifold or direct into the cylinder in the highly desirable liquid stage. A way of doing so is shown in FIG. 1.

It is highly advantageous to be able to simplify the installation by deleting the return of fuel to the tank. An additional benefit is not raising the tank temperature of the LPG.

Whereas this description concentrates upon the use of LPG as the fuel it is possible to utilize mixed fuels of which LPG may be a constituent, utilizing a mixer prior to the inlet of the high pressure pump. Alternatively, the pump and fuel measuring device may be one unit with a mixer prior to or integral with the accumulator, as in FIG. 2.

The invention provides in one aspect a liquid fuel injection system for a combustion engine comprising, a liquid fuel injection system for a combustion engine comprising, a high pressure electric pumping system arranged to receive high vapor pressure fuel in liquid form from a pressure tank holding a high vapor pressure fuel the electric pumping system being arranged to pump the liquid high vapor pressure fuel from the pressure tank at a controlled pressure high enough to ensure it is pumped in liquid form to a variable volume accumulator which is arranged to direct the liquid fuel to fuel injectors for the combustion engine, and a regulating system for maintaining the fuel pumped to the fuel injectors at the controlled pressure in liquid form.

An economical high pressure liquid LPG fuel supply system for an internal combustion engine is described. The LPG can be fed from an LPG tank, either vapor pressure fed, or with the aid of a low pressure submerged pump in the tank, providing a LPG feed at tank vapor pressure, plus up to 250 kPa from the submerged pump, to a high pressure pump capable of delivering at least 2.5 MPa pressure. The purpose behind the use of the low pressure pump is the avoidance of cavitations on the inlet side of the high pressure pump.

The pumping of the LPG in liquid form from the tank to the inlet side of the high pressure pump may include a return line to the LPG tank and a pressure regulation device in the form of a one way valve, such valve having a fixed spring of a certain cracking pressure and located at the return inlet to the tank, as disclosed in the prior art quoted, Granted Australian Patents 647561, 647857. A similar system of a return line for diesel can be utilized.

Figure 2:
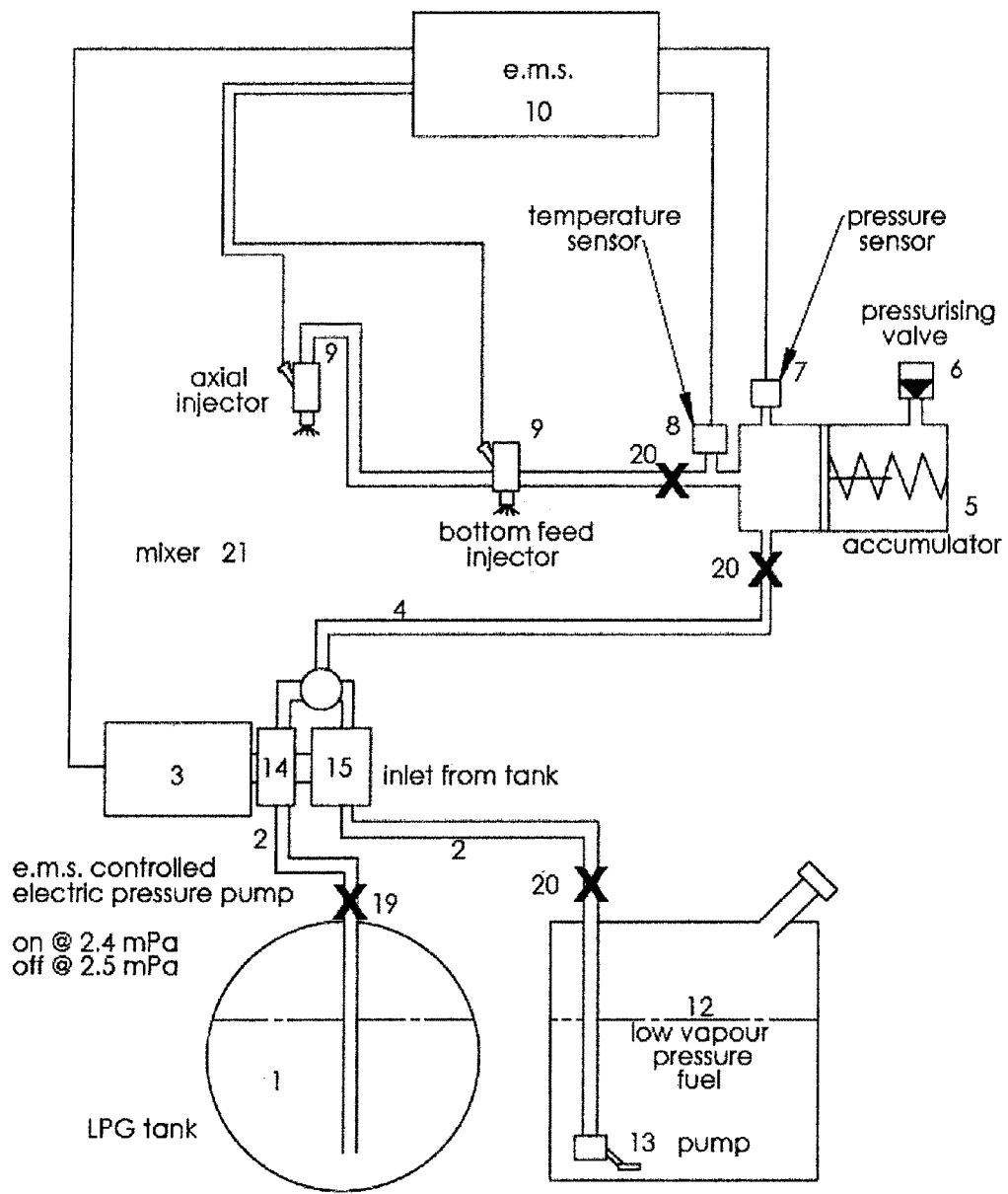
FIG. 2 is a schematic representation of a second embodiment of the system of the present invention.

The high pressure pump in the preferred embodiment delivers liquid LPG at 2.5 MPa pressure to the fuel line and to an accumulator having a suggested capacity capable of fuelling the engine in question for one minute at peak revolutions. As shown in FIGS. 1 and 2 the accumulator is a variable volume accumulator by virtue of a spring loaded diaphragm which is movable to vary the capacity of the accumulator.

This period of one minute is ample time in which to achieve a changeover from one fuel type to another. The engine management system can calculate the time required for the first fuel to be almost exhausted from the fuel lines and accumulator, gauging the fuel pressure and temperature in the lines, before changing to the second fuel at the optimum pressure for that fuel to be injected through the same injectors delivering the liquid fuel.

The high pressure pump and accumulator can be set at any pressure which will guarantee that the LPG remains in a liquid state for injection, directly into the engine or into the engine intake manifold.

Upon demand, the liquid LPG can be fed to injectors, axial or bottom feed injectors on the engine, via a distribution manifold and flexible high pressure fuel lines, providing the LPG to each injector. An alternative is to utilize a common rail system as found in modern diesel engines which method is suitable for direct into the cylinder fuel injection.

A pressure switch, acting in accordance with the pressure in the accumulator turns the high pressure pump off, either directly or through the engine management system (EMS) when the set pressure (here 2.5 MPa) is reached. Upon the pressure in the accumulator falling by one hundred kPa, or other preferred pressure difference, a switch will turn on the high pressure pump to restore the set pressure.

Alternatively the speed of the high pressure pump can be modulated by the EMS to match the delivery rate to engine requirement thereby maintaining a constant pressure.

The accumulator may be used to ensure constant delivery of LPG in liquid form to the injectors at all operating times and to assist starting of the engine following a period of shut down of the engine or, by choice, the accumulator may be dispensed with, which would reduce the time needed to exhaust the old fuel in the accumulator when changing from one fuel to another and reliance can rest upon the high pressure pump to provide sufficient high pressure fuel at all operating moments to ensure smooth operation of the engine. The absence of a conventional accumulator may be aided by elasticity in the tubing used to conduct the liquid LPG from the pump to the injectors as the elasticity allows the tubing to be an accumulator.

Hot starts may not be instantaneous due to vaporization of the LPG in the fuel lines whilst the engine is stopped.

In this invention the high pressure accumulator can be used to keep LPG in the liquid state ready for an instant start, or re-start of the engine.

The injectors may be designed to deliver LPG at pressures up to and over 20 MPa with a preference to operating around 2.5 MPa so limiting the energy needed to drive the system, but still allowing for direct into the cylinder injection or injection into the engine manifold.

The pressure of injection is such as to keep liquid fuel at the tip of the injector for injection into the inlet manifold of the engine or directly into the cylinders of the engine.

The system can be aided by heat shielding of components and cooling, via the air conditioning system of the vehicle or other means, of the high vapor pressure fuel.

Experience with the prior art has encountered the heating up of the LPG by its continuous recirculation through the injectors and fuel lines of the engine.

It is preferable that the LPG can be supplied from the high pressure pump to the engine without a return line to the LPG tank so as to avoid raising the temperature of the LPG in the tank, which heat can raise the vapor pressure and affect the time taken for filling the LPG tank, plus incurring the added cost and complexity of return tubing.

The invention will be generally discussed in relation to the operation of a liquefied petroleum gas fuelled vehicle, as an example of a high vapor pressure fuel system, but the invention is not restricted to this fuel.

This present invention can provide an arrangement whereby such an engine can be supplied to advantage with high pressure bottom feed or axial feed injectors of a size equal to or smaller than commonly used petrol injectors. The bottom feed injectors discussed by this invention do not require to be placed in a housing or pod, the outer shell of the injector serving that function. They do not sit in a series of pods, constituting a fuel rail, but are connected, in the preferred embodiment, by flexible high pressure fuel lines from pump or accumulator to injector. A common rail system or plastic coated steel fuel lines may be used to feed the injectors.

It is of assistance and is specified as the desired option in this invention that to deliver liquid LPG to the injecting orifice of the injector, adequate pressure is exerted by the high pressure pump to keep the LPG liquid in all normal circumstances of motoring and the desired pressure is 2.5 MPa.

Utilizing an axial injector the fuel is fed through the top of the injector in the common embodiment. With a bottom feed injector, the fuel is fed to the bottom of the injector and removed therefrom if so required via arms which are rigid and to which the flexible tubing used is connected or a common rail is used.

The nozzle of the injector can be relatively small at 8 or 9 mm in diameter and can be fitted with a collar to ensure that the injector is a snug fit in the holes provided in the inlet manifold by the engine manufacturer. This aids rapidity and economy of assembly.

The pressure and temperature of the LPG is taken at closely located points to determine, via the EMS, from look up charts the composition of the LPG. This knowledge is then used to set the base injection pulse width and ignition timing specific to the fuel composition, is the readings for which are then modified by the oxygen sensor and other inputs required for the effective running of the engine by the EMS in the normal manner, as disclosed in Australian Patent 647857.

Dual Fuel System

With dual fuel systems that inject the fuel in the liquid state via bottom feed injectors as in Australian Patents 647561 "A Method of Fuel Injection" and 647857 "Dual Fuel Injection System" there exists a problem in sizing the required injectors, relatively low flow injectors for high pressure LPG, and relatively high flow injectors for low pressure petrol injection.

Using one high pressure pump and one set of high pressure injectors eliminates the need for a second set of low pressure injectors when running solely on petrol or other low vapor pressure fuel.

According to one aspect of the invention this problem can be ameliorated by injecting both fuels at the relatively high pressure of 2.5 MPa. The fuel to be used can be selected by use of lock off solenoids on the fuel lines with care being taken to ensure that there is no flowing of one fuel to the tank of the alternative.

A mixed charge of differing fuels can be used employing the aid of a mixer which can mix the fuels in set proportions and such proportions can be varied.

In the preferred embodiment, shown in FIG. 2, the pressurizing of the fuels or fuel is shown with integral measuring of the relative volume of the fuels.

Figure 3:
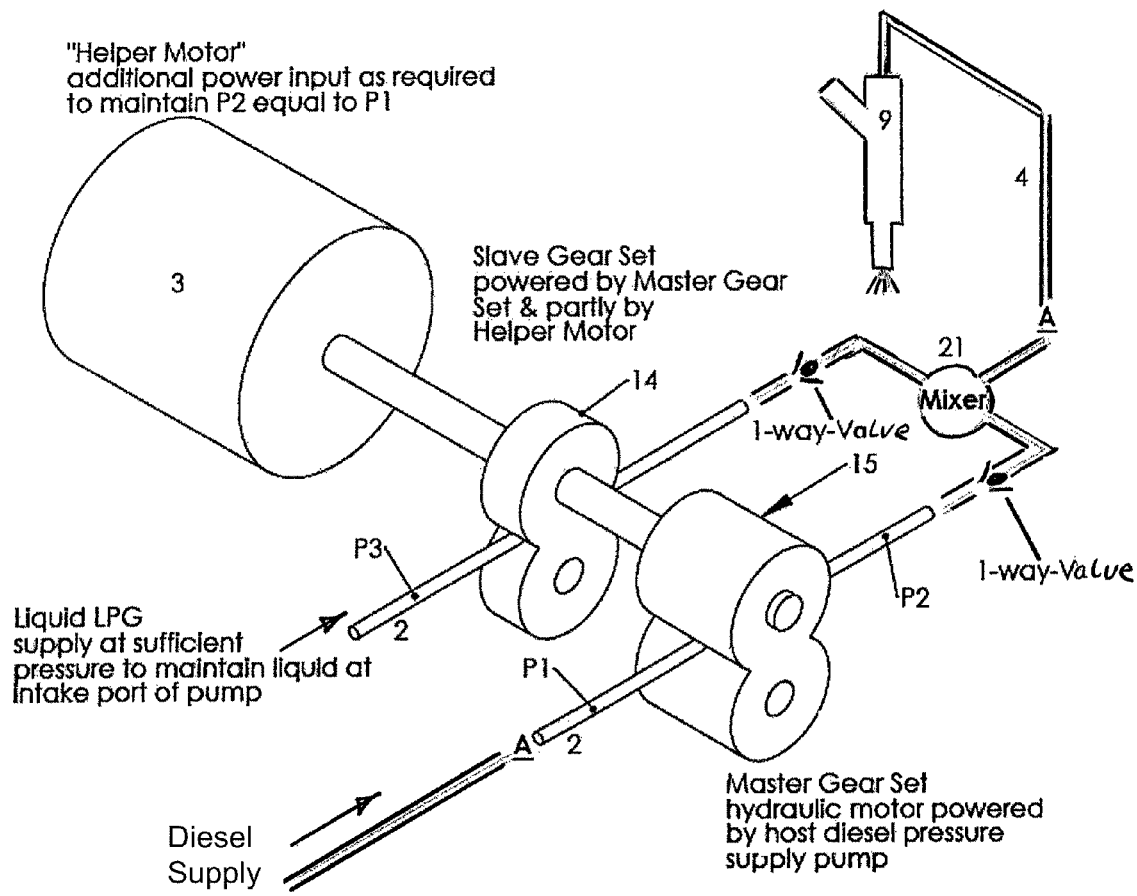
FIG. 3 depicts a system of integral measuring by the use of two pumps mounted on a common shaft.

A system of integral measuring by the use of two pumps mounted on a common shaft is shown in FIG. 3.

Adequate mixing of the fuels may also be achieved with a mixer prior to or being an integral part of the accumulator.

Economy is served if the pump in the LPG tank can be dispensed with and this will depend on the ability to avoid cavitations at the inlet of the high pressure pump and therefore depend on operating conditions encountered.

Prior to this invention a common method of switching from the high vapor pressure fuel to the low vapor pressure fuel is to allow the pressure in the fuel rail to subside after switching off the high vapor pressure fuel, mainly LPG in Australia or Europe and propane in the United States of America. For the pressure in the fuel rail to subside to a level of less than 250 kPa or such level as the fuel pump will normally pump the low vapor pressure fuel such as petrol may take 2 minutes of time during which the engine will not run in an effective manner.

If the engine is in a motor vehicle, the vehicle is normally stationary during the fuel changeover and this can be a source or irritation and inconvenience, even danger. This problem is avoided as all fuels are injected at similar pressures thereby requiring no time for pressure adjustment.

In the current invention the high pressure pump can be used for the injection of a mixture of both fuels, or other suitable alternative fuels, through the one set of injectors, otherwise petrol or LPG as a single fuel, with solenoid control over the fuel selected.

In such a system the alteration to the power output will be a minimum in any changeover of fuels and both fuels can successfully be injected at high pressure. For LPG or petrol, or a petrol LPG mix, the engine may be a spark ignition engine and for diesel, or a diesel LPG mix, the engine may be a compression ignition engine. However a variable compression engine fitted with spark ignition such as that disclosed in UK Patent cover Family 4, EP Number 03792495.8, PCT No. PCT/GB2003/003643 can utilize all of the above fuels.

Using the computing facilities of the engine management system into which the temperature and pressure of the fuel are fed the appropriate pulse width for the injectors can be calculated for which verification of the fuel mix being used by the engine can come from exhaust sensors which also read back to the engine management system and compensate for fuel metering errors.

Accordingly, the present invention can be directed to a high pressure single fuel injection, or a dual fuel system employing high and low vapor pressure fuels which will be capable of being switched from one fuel to the other, or operating with mixed fuels, without interrupting the effective functioning of the engine.

Whereas the mixed fuels may commonly be LPG and petrol, or ethanol, it is possible to use a mix of LPG and diesel, including biodiesel where the engine is a compression ignition engine and in which case the injection of the fuel mix for maximum efficiency, could be direct into the cylinder.

Although various forms of the invention have been described it is to be noted the invention is not limited thereto but can include variations and modifications falling within the spirit and scope of the invention.

What is claimed is:

1. A liquid fuel injection system for a combustion engine, comprising:
   a pressure tank containing liquid petroleum gas (LPG) fuel in liquid form;
   a fuel line extending from the pressure tank and communicating with a variable volume accumulator and fuel injectors for the combustion engine; and
   a high pressure electric pumping system having an electric pump in communication with the fuel line;
   wherein the electric pumping system is set to switch the electric pump on and off to control fuel pressure in the fuel line, fuel injectors, and the variable volume accumulator such that the pressure is at least 2.4 MPa and the LPG is maintained in liquid form through the fuel line, the variable volume accumulator, and the fuel injectors; and
   wherein the accumulator has sufficient liquid LPG capacity to facilitate starting of the combustion engine with liquid LPG supplied to the fuel injectors following a period of shut down.

2. The liquid fuel injection system according to claim 1, wherein the regulating system is adapted to maintain the controlled pressure within a narrow pressure range.

3. The liquid fuel injection system according to claim 1, wherein the accumulator has sufficient fuel capacity to maintain operation of the engine for sufficient time to allow changeover to an alternative fuel while maintaining pressure of the LPG liquid fuel during the changeover and supplying the alternative fuel at a similar pressure.

4. The liquid fuel injection system according to claim 2, wherein the regulating system comprises the accumulator and a pressure switch operable in response to a pressure level in the accumulator to turn the high pressure electric pumping system on and off to maintain the pressure within the narrow pressure range.

5. The liquid fuel injection system according to claim 4, wherein the limits of the narrow pressure range are 2.4 MPa and 2.5 MPa.

6. The liquid fuel injection system according to claim 4, wherein the pressure switch operates the high pressure electric pump through an engine management system controlling the combustion engine.

7. The liquid fuel injection system according to claim 1, wherein there is no fuel line downstream of the high pressure electric pumping system arranged to return the fuel to the pressure tank.

8. The liquid fuel injection system according to claim 7, further comprising a secondary tank for holding a secondary fuel and a feed system for mixing the secondary fuel and the LPG fuel downstream of the high pressure electric pumping system whereby the accumulator holds a mixture of both fuels.

9. The liquid fuel injection system according to claim 8, wherein the high pressure electric pumping system is adapted to pump a constant ratio of LPG fuel to secondary fuel, to the accumulator.

10. The liquid fuel injection system according to claim 8 comprising a mixer for mixing both fuels prior to being fed to the accumulator.

11. The liquid fuel injection system according to claim 9 wherein the pumping system comprises at least two pumps operated by the same power shaft.

12. The liquid fuel injection system according to claim 1, wherein the accumulator comprises elastic fuel lines adapted to maintain fuel at substantially constant pressure.

13. The liquid fuel injection system according to claim 1, wherein the accumulator comprises a vessel with a diaphragm movable to vary the fuel holding capacity of the vessel so as to maintain the fuel at a substantially constant pressure.

14. The liquid fuel injection system according to claim 13, wherein the diaphragm is movable in response to force from at least one of: a spring or a pressurizing gas.

15. The liquid fuel injection system according to claim 8, further comprising a valving system for selecting only one of the secondary fuel or the LPG fuel for operating the combustion engine.

16. The liquid fuel injection system according to claim 15, wherein the valving system comprises solenoid operated lock off valves operable by an engine management system.

17. The liquid fuel injection system according to claim 1, wherein the fuel injectors comprise axial or bottom feed injectors.

18. The liquid fuel injection system according to claim 1, wherein the accumulator provides fuel to a common rail in-cylinder injection system.

19. The liquid fuel injection system according to claim 1, wherein the controlled pressure can be set by an engine management system controlling the high pressure pumping system.

* * * * *